United States Patent
Seshadri et al.

(10) Patent No.: US 9,207,994 B2
(45) Date of Patent: Dec. 8, 2015

(54) SCHEDULING TASKS AMONG PROCESSOR CORES (75) Inventors: Harinarayanan Seshadri, Bangalore (IN); Rajeev Muralidhar, Bangalore (IN); Vishwesh M. Rudramuni, Bangalore (IN); Illyas Mansoor, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,879

(22) PCT Filed: May 9, 2012

(86) PCT No.: PCT/US2012/037171
§ 371 (c)(1),
(2), (4) Date: Jun. 25, 2013

(87) PCT Pub. No.: WO2013/169249
PCT Pub. Date: Nov. 14, 2013

(65) Prior Publication Data
US 2013/0318379 A1    Nov. 28, 2013

(51) Int. Cl.
*G06F 9/00*    (2006.01)
*G06F 1/32*    (2006.01)
(Continued)

(52) U.S. Cl.
CPC .............. *G06F 9/5094* (2013.01); *G06F 1/206* (2013.01); *G06F 1/324* (2013.01); *G06F 1/3206* (2013.01);
(Continued)

(58) Field of Classification Search
CPC ....... G06F 9/00; G06F 1/3206; G06F 9/5094; G06F 9/5032

USPC ................................................. 713/300, 320
See application file for complete search history.

(56) References Cited

U.S. PATENT DOCUMENTS 7,930,564 B2    4/2011 Arai et al.
8,112,648 B2    2/2012 Branover et al.
(Continued)

FOREIGN PATENT DOCUMENTS

TW    200700990    1/2007

OTHER PUBLICATIONS

International Search Report and Written Opinion mailed Jan. 2, 2013 for International Application No. PCT/US2012/037171, 9 pages.
(Continued)

*Primary Examiner* — Jaweed A Abbaszadeh
*Assistant Examiner* — Terrell Johnson
(74) *Attorney, Agent, or Firm* — Schwabe, Williamson & Wyatt, P.C.

(57) ABSTRACT

Embodiments of apparatus, computer-implemented methods, computing devices, systems, and computer-readable media (transitory and non-transitory) are described herein for scheduling a plurality of tasks among a plurality of processor cores. A first processor core of a plurality of processor cores of a computing device may be transitioned to a shielded state, in which no new tasks are to be assigned to the first processor core and tasks already assigned to the first processor core are executed to completion, in response to a determination that a criterion has been met. In various embodiments, the criterion may be based on a condition of the computing device, such as power available to the computing device or a temperature associated with the computing device. In various embodiments, the first processor core may transition to a reduced-power state after the tasks already assigned to the first processor core execute completion.

25 Claims, 6 Drawing Sheets (51) Int. Cl.
  *G06F 9/50* (2006.01)
  *G06F 1/20* (2006.01)

(52) U.S. Cl.
  CPC ............ *G06F 1/3287* (2013.01); *G06F 1/3296* (2013.01); *G06F 9/00* (2013.01); *Y02B 60/1217* (2013.01); *Y02B 60/1275* (2013.01); *Y02B 60/1282* (2013.01); *Y02B 60/142* (2013.01); *Y02B 60/144* (2013.01)

(56) References Cited

U.S. PATENT DOCUMENTS

| | | | |
|---|---|---|---|
| 8,171,319 | B2 | 5/2012 | Ghiasi et al. |
| 2003/0097508 | A1* | 5/2003 | Aneshansley ................ 710/302 |
| 2006/0294397 | A1* | 12/2006 | Baker ........................... 713/193 |
| 2007/0150759 | A1 | 6/2007 | Srinivasan et al. |
| 2010/0268968 | A1* | 10/2010 | Ghiasi et al. ................ 713/300 |
| 2013/0074090 | A1* | 3/2013 | Kumar et al. ................ 718/104 |

OTHER PUBLICATIONS

International Preliminary Report on Patentability mailed Nov. 20, 2014 for International Application No. PCT/US2012/037171, 6 pages.

Taiwan Foreign Search Report mailed Oct. 29, 2014 for Taiwan Patent Application No. 102113261, 13 pages.

Office Action mailed Feb. 13, 2015 for Taiwan Application No. 102113261, 5 pages.

Office Action mailed Aug. 5, 2015 for Australian Patent Application No. 2012379690, 3 pages.

Office Action mailed Aug. 18, 2015 for Australian Patent Application No. 2012379690, 3 pages.

\* cited by examiner

SCHEDULING TASKS AMONG PROCESSOR CORES

CROSS REFERENCE TO RELATED APPLICATIONS

The present application is a national phase entry under 35 U.S.C. §371 of International Application No. PCT/US2012/037171, filed May 9, 2013, entitled "SCHEDULING TASKS AMONG PROCESSOR CORES", which designated, among the various States, the United States of America. The Specification of the PCT/US2012/037171 Application is hereby incorporated by reference.

FIELD

Embodiments of the present invention relate generally to the technical field of data processing, and more particularly, to scheduling tasks among processor cores.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Operating system ("OS") schedulers may assign tasks among a plurality of computing resources such as processor cores in a manner that reduces an overall response time to complete the tasks. This fairness principle may provide suitable overall performance and minimize latency, particularly where the processing resources are homogenous. Typically, this method of scheduling tasks does not account for conditions of a computing device or differences between heterogeneous computing resources of a computing device.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However the order of description should not be construed as to imply that these operations are necessarily order dependent, in particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C) or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
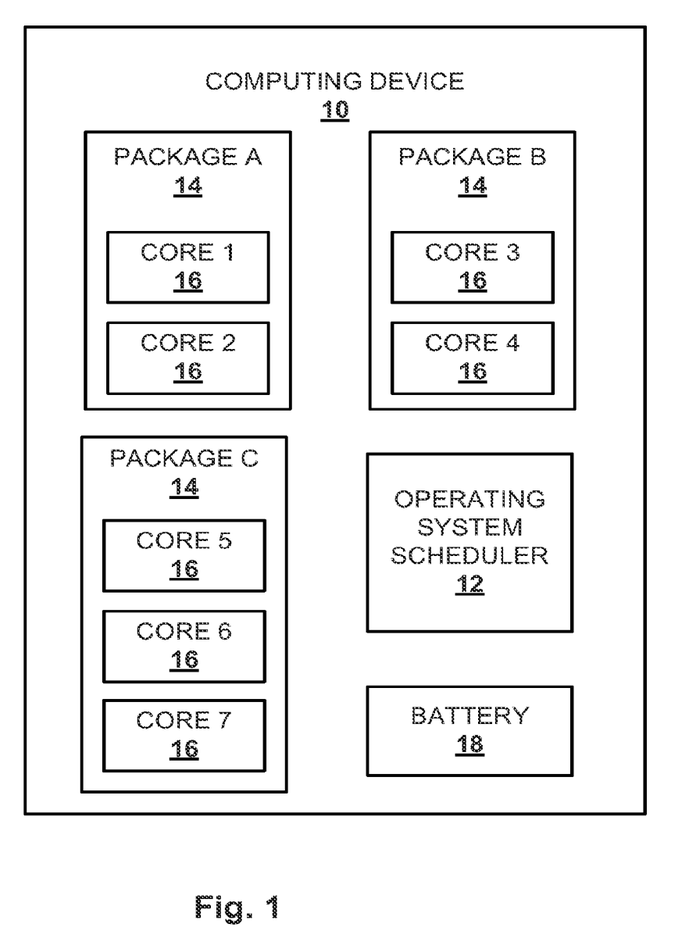
FIG. 1 schematically depicts an example system having a plurality of processor cores and art operating system ("OS") scheduler of the present disclosure, in accordance with various embodiments.

Referring now to FIG. 1, in various embodiments, a computing device 10 (configured with applicable portions of the teachings of the present disclosure) may include an operating system ("OS") scheduler 12 and one or more packages 14, each package including one or more processor cores 16.

The example in FIG. 1 includes three packages 14, PACKAGE A-C, but this is for illustrative purposes only and is not meant to be limiting. A first package 14, PACKAGE A, includes two processor cores 16: CORE 1 and CORE 2. A second package 14, PACKAGE B, also includes two processor cores 16: CORE 3 and CORE 4. A third package 14, PACKAGE C, includes three processor cores 16: CORE 5, CORE 6 and CORE 7. Other numbers of packages 14 and processor cores 16 are contemplated herein.

In various embodiments, different cores 16 may operate at different frequencies. For example, CORE 1 and CORE 2 on PACKAGE A may operate at one frequency, e.g., 3.1 GHz, while CORE 3 and CORE 4 on PACKAGE B may operate at another frequency, e.g., 1600 MHz. In various embodiments, cores 16 contained on a single package 14 may operate in different frequencies. A core 16 operating at a higher frequency may complete a task more quickly than a core 16 operating at a lower frequency. However, the core 16 operating at the higher frequency also may utilize more energy and/or produce more heat than the core 16 operating at a lower frequency.

A multi-core computing device such as computing device 10 may be powered by a power source such as a battery 18 having a limited supply of energy. The more cores 46 operating at once—particularly high-frequency cores 16—the more quickly the power source battery 18) may be depleted. Every processor core 16 of computing device 10 may not be needed all the time. For example, if computing device 10 is a mobile phone, there may be no need for more than minimal processing power when the mobile phone is in a user's pocket, performing only limited functions to maintain a network connection.

Additionally or alternatively, computing device 10 may include one or more components that may be vulnerable to various thermal conditions. For example, certain types of components may be damaged by an increase in temperature. A processor core 16 may generate heat when it is executing a task. Overloading the plurality of processor cores 16 of computing device 10 may generate excessive heat, threatening damage to various components. Additionally or alternatively, computing device 10 may be subjected to a heated environment, such as the inside of a vehicle on a hot day. Allowing a plurality of processor cores 16, particularly high-frequency processor cores 16, to continue running under such circumstances may increase the temperature further, damaging various components.

Figure 2:
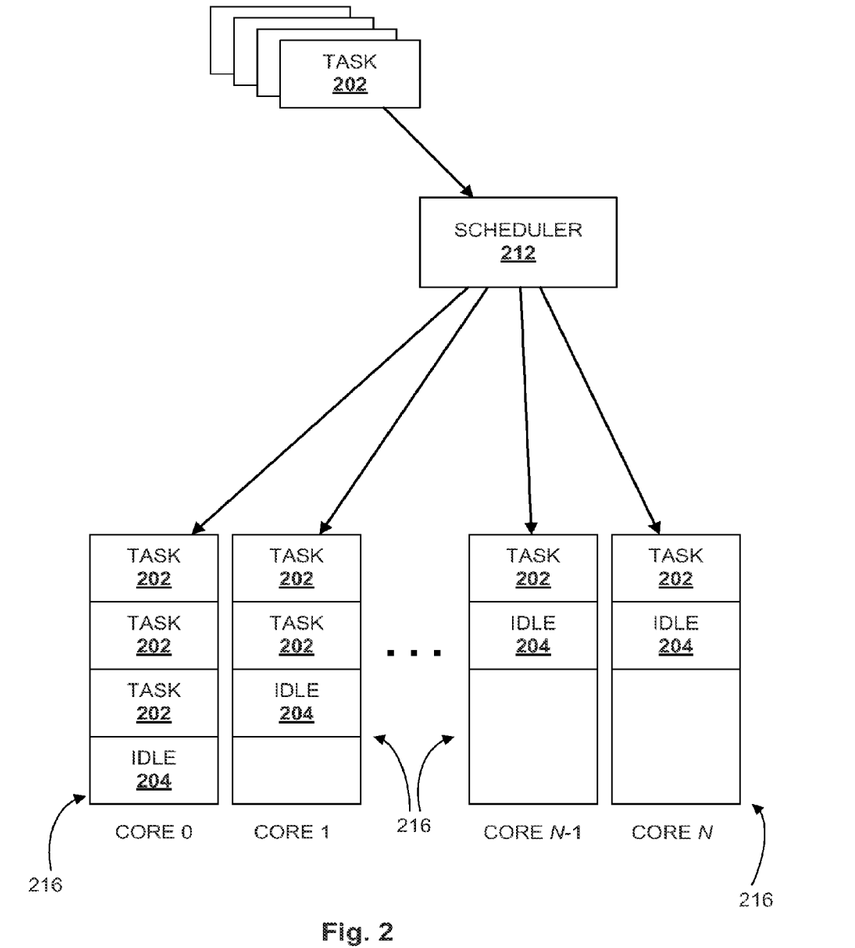
FIG. 2 schematically depicts an example of how an OS scheduler may schedule a plurality of tasks among a plurality of processor cores, in accordance with various embodiments.

FIG. 2 depicts an example OS scheduler 212 that may be configured to schedule a plurality of tasks 202 among n processor cores 216, where n is an integer greater than one. Each core 216 may include a run queue that may include one or more scheduled tasks. In the illustrated example scenario, CORE 0 has three tasks 202 queued up before it enters into an idle state 204. CORE 1 has two tasks 202 queued up before it enters into an idle state 204. CORE n−1 and CORE n each has one task 202 queued up before it enters into an idle state 204. OS scheduler 212 may be configured to distribute tasks 202 in a manner that reduces the overall response time to complete the tasks. Thus, assuming all tasks 202 are similar in complexity, OS scheduler 212 may schedule the next task 202 on CORE n or CORE n−1. However, this scheduling scheme may not take into account energy efficiency, the nature of a heterogeneous processor cores and/or a condition of the computing device.

Accordingly, in various embodiments, one or more processor cores 16 may be shut down to conserve battery power and/or prevent damage to components of computing device 10 caused by thermal events. In systems and computing devices with heterogeneous processor cores 16, a core 16 operating at a relatively high frequency may require more power and/or may produce more heat than another core operating at a relatively low frequency. Accordingly, various thresholds may be set (as will be described below) so that one or more processor cores 16 operating at relatively high frequencies may be more likely to be shut down to reduce power consumption and/or temperature of the device. (The term "heterogeneous" as used herein refers to the different operating characteristics of the processor cores, including but not limited to, e.g., their operating frequencies.)

The costs associated with shutting down a processor core 16 that still has tasks to complete may be high, and may cancel out any gains in energy efficiency or temperature control. For example, a kernel may need to be notified that the processor core 16 is being shut down. A new set of processor cores 16 that can take over the tasks assigned to the processor core 16 to be shut down may be identified. Tasks and interrupts associated with the processor core 16 to be shut down may be migrated to the identified set of processor cores 16. In various embodiments, services associated with the processor core 16 to be shut down may also be migrated to other processor cores 16. Finally, the processor core 16 may be shut down. The latency associated with shutting down a processor core 16 may be unpredictable, and can be on the order of a few seconds, resulting in negative energy savings.

Figure 3:
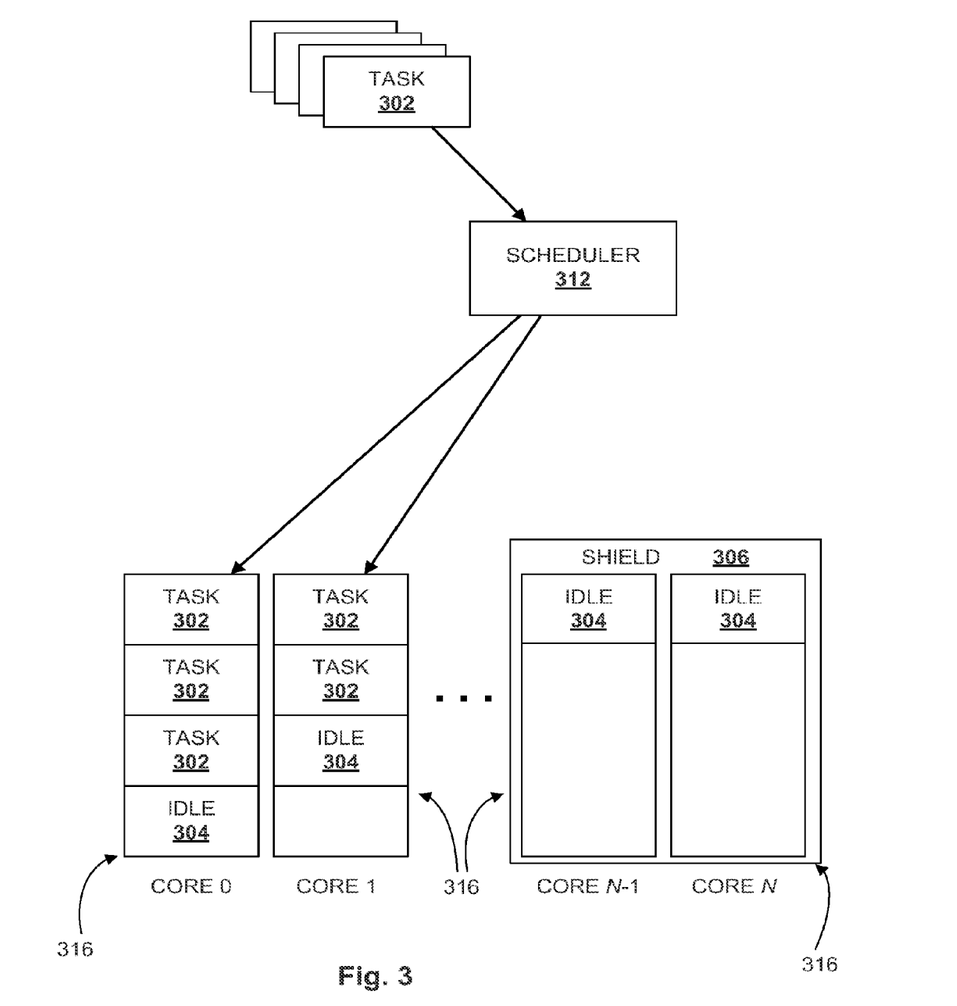
FIG. 3 schematically depicts another example of how an OS scheduler may schedule a plurality of tasks among a plurality of processor cores, in accordance with various embodiments.

Accordingly, rather than shutting down a core immediately, an OS scheduler such as OS scheduler 12 in FIG. 1 may transition processor cores into an intermediate "shielded" state in which no new tasks are to be assigned, and in which existing tasks are executed to completion. An example of this is shown in FIG. 3. An example OS scheduler 312 may be configured to schedule a plurality of tasks 302 among n processor cores 316. As with FIG. 2, each core 316 includes a run queue that may have one or more tasks scheduled. For example, CORE 0 has three tasks 302 queued up before it enters into an idle state 304, and CORE 1 has two tasks 302 queued up before it enters into an idle state 304. However, OS scheduler 312 has transitioned CORE n−1 and CORE n into a shielded state, as indicated by the shield block 306.

In various embodiments, a processor core 316 in a shielded state may not have new tasks assigned to it. In various embodiments, one or more tasks already assigned to a shielded processor core 316 may be executed to completion, without being migrated to other processor cores. After the one or more tasks already assigned to the shielded processor core 316 are executed to completion, the shielded processor core 316 may be transitioned to a reduced power state. This may reduce and/or avoid costs associated with migrating tasks among processor cores 316.

In various embodiments, when a processor core 316 is in a reduced-power state, one or more core phase lock loops associated with the processor core may be shut down. In various embodiments, a cache associated the processor core 316 may be flushed. In various embodiments, a state of the processor core 316 may be saved to cache. In various embodiments, power usage by a processor core 316 may be approximately 40 uw. In various embodiments, a processor core 316 in a reduced-power state may be in a thread level C6.

In various embodiments, a processor core (e.g., processor cores 316 in FIG. 3) may be transitioned into or out of a shielded state in response to a determination that one or more criteria have been met. In various embodiments, the criterion may be whether a workload of the plurality of processor cores falls below or exceeds a threshold. In various embodiments, the workload may be an average workload of the plurality of processor cores. In various embodiments, the average workload may be determined by periodically measuring a current load level of a plurality of processor cores. In various embodiments, the current load level of the plurality of processor cores may be measured every 4-6 seconds.

Figure 4:
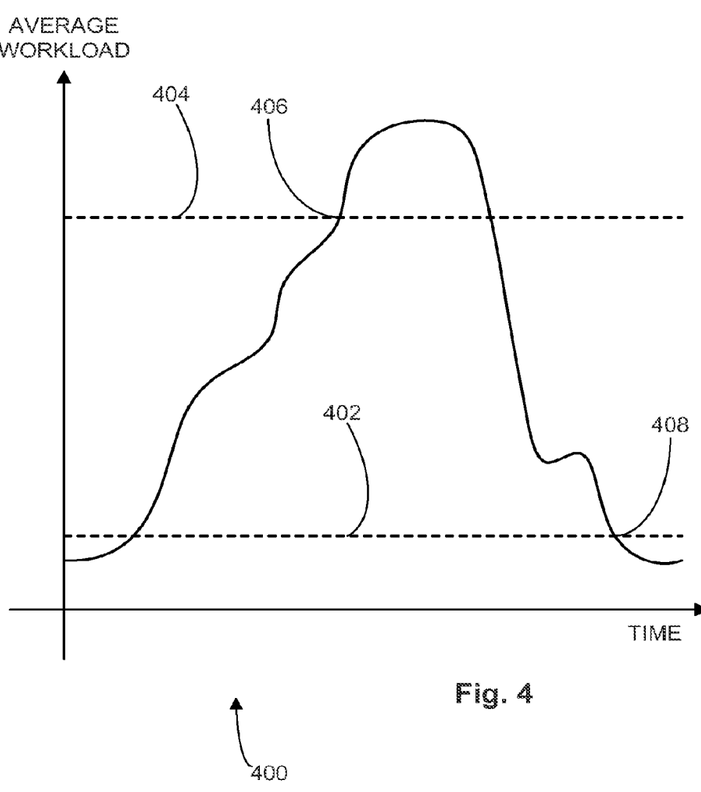
FIG. 4 depicts a chart showing an example average workload of a plurality of processor cores over time, as well as high and low workload thresholds that, when reached by the average workload, may lead to one or more processor cores being transitioned into or out of a shielded state, in accordance with various embodiments.

In the chart 400 of FIG. 4, an example of average workload of a plurality of processor cores over time is shown. A first threshold 402 may be a "low watermark," below which one or more processor cores of the plurality of processor cores may be transitioned to the shielded state. A second threshold 404 may be a "high watermark," above which one or more processor cores of the plurality of processor cores may be transitioned out of the shielded state.

Prior to point 406, the average workload may be below second threshold 404, and one or more processor cores may be in a shielded state and/or in a reduced power state. However, at point 406, when the average workload exceeds second threshold 404, one or more processor cores in shielded and/or reduced power states may be transitioned to an unshielded state. Once unshielded, a processor core may be assigned tasks by an OS scheduler (e.g., 12, 212, 312).

These newly unshielded processor cores may continue to operate until, at point 408, the average workload falls below first threshold 402. When this occurs, one or more processor cores of the plurality of processor cores may be transitioned to a shielded state, in which no new tasks are to be assigned to the processor cores (e.g., by an OS scheduler 12, 212 or 312), and/or in which existing tasks already assigned to the processor cores are executed to completion. Once existing tasks assigned to the newly shielded processor cores are executed to completion, in various embodiments, those shielded processor cores may be transitioned, e.g., by an OS scheduler (e.g., 12, 212, 312), into a reduced power state.

In various embodiments, separate "high watermark" and "low watermark" thresholds may be established for separate processor cores. For example, a processor core that runs at a particularly high frequency (and thus is more power-intensive) may have an associated "low watermark" threshold (below which it is shielded) that is higher than other, less power-intensive processor cores. That way, the high-frequency processor core may be more likely to be transitioned to a shielded state (and ultimately, a reduced-power state) than a relatively low-frequency processor core.

Similarly, a high-frequency processor core may have an associated "high watermark" threshold (above which it is unshielded) that is higher than "high watermark" thresholds for other, lower frequency processor cores. That way, the high-frequency processor core may not be unshielded until the average workload of a plurality of processor cores is high enough to justify use of the high-frequency core, in spite of the consequences in terms of energy use and temperature.

On the other hand, in various embodiments, a processor core that runs at a relatively low frequency may have an associated "low watermark" threshold that is lower than that associated with a high-frequency processor core. That way, the low-frequency processor core may be less likely to be transitioned to a shielded state. Similarly, the low-frequency processor core may have a "high watermark" threshold that is also relatively low, so that it is more likely to remain unshielded and operate at moderate average workloads.

Of course, these examples are illustrative only, and in various embodiments, thresholds associated with a high-frequency processor core may be higher than, lower than and/or equal to thresholds associated with a low-frequency processor core. Additionally, in various embodiments, only a subset of a plurality of processor cores, e.g., those cores requiring relatively large amounts of power or producing relatively large amounts of heat, may have associated thresholds. Other processor cores, e.g., low-frequency processor cores that perform basic functions (e.g., keeping a mobile phone connected to a cell), may not have thresholds, or may have thresholds that are unlikely to be met.

In addition to being different for different processor cores, in various embodiments, thresholds may be dynamically based on conditions of a computing device. For example, in various embodiments, a threshold may be determined based on one or more of a battery power level of the computing device, a thermal condition of the computing device, a level of current being used by the computing device (e.g., peak/burst), and so forth.

For example, if battery 18 of computing device 10 of FIG. 1 falls below a particular power level, "low watermark" thresholds associated with one or more processor cores 16 of computing device 10 may be raised, so that those processor cores 16 may be more likely to transition to a shielded stated, and then to a reduced power state. In various embodiments, "high watermark" thresholds associated with various processor cores 16 may also be raised, to decrease the likelihood that those processor cores 16 may be unshielded and assigned tasks.

In various embodiments, one or more thresholds may be adjusted based on a thermal state of a computing device. For instance, if a temperature of computing device 10 of FIG. 1 rises above a particular level, there may be danger of damage to one or more components of computing device 10. Accordingly, "tow watermark" thresholds associated with one or more processor cores 16 of computing device 10 may be raised, so that those processor cores 16 may be more likely to transition to a shielded stated, and then to a reduced power state. As with previous examples, in various embodiments, "high watermark" thresholds associated with various processor cores 16 may also be raised, to decrease the likelihood that those processor cores 16 may be unshielded and assigned tasks.

One or more thresholds may also be selected based at least in part on the nature of computing device 10. For example, if computing device 10 is a mobile phone, a user may expect the battery life to be longer than another portable device, such as a laptop computer. Accordingly, "high watermark" and "low watermark" thresholds associated with various processor cores 16 may be selected, e.g., by a manufacturer or by a user using a user interface associated with an operating system, to more aggressively conserve energy than if computing device 10 were a laptop computer. For example, "high watermark" and "low watermark thresholds" may both be raised. This may increase the likelihood that processor cores may be shielded, and decrease the likelihood that shielded processor cores may be unshielded.

One or more thresholds may also be selected based on how computing device 10 may be used. For example, if computing device 10 is to be used for graphics intensive applications, then thresholds associated with graphics-related processor cores (e.g., on a graphics card) may be lowered. This may increase the likelihood that these processor cores will be unshielded and decrease the likelihood that they will be shielded. If computing device 10 is going to be used largely for voice communications, then the thresholds associated with communications-related processor cores may be lowered accordingly, and thresholds associated with other cores (e.g., graphics-related) may be raised.

Figure 5:
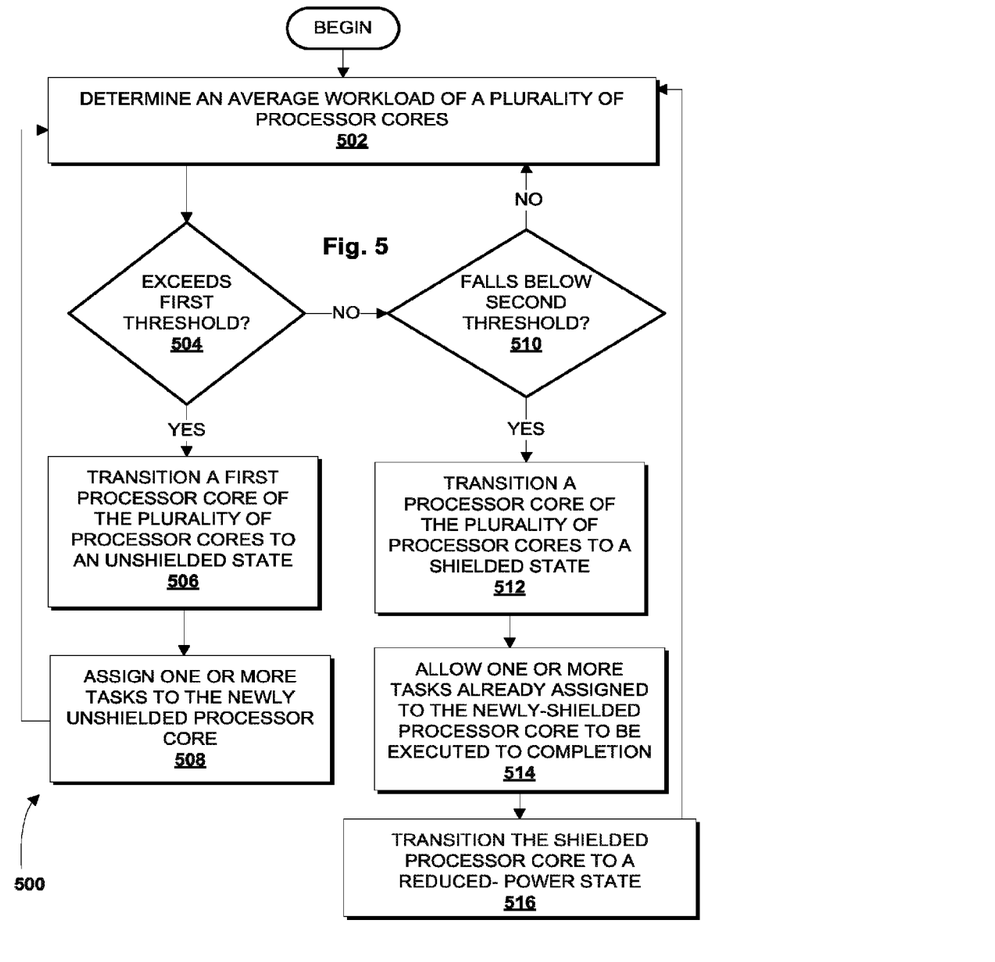
FIG. 5 schematically depicts an example method that may be implemented by an OS scheduler of a multi-core computing device, in accordance with various embodiments.

FIG. 5 depicts an example method 500 that may be implemented by an OS scheduler such as OS scheduler 12 in FIG. 1, OS scheduler 212 in FIG. 2 and/or OS scheduler 312 in FIG. 3. At block 502, an average workload of a plurality of processor cores may be determined, e.g., by an OS scheduler 12. In various embodiments, this determination may be made, e.g., by OS scheduler 12, by periodically measuring an instantaneous workload of the plurality of processor cores, and updating a running average workload.

At block 504, it may be determined, e.g., by OS scheduler 12, whether the average workload determined at block 502 exceeds a first threshold. For instance, it may be determined, e.g., by OS scheduler 12, whether the average workload of the plurality of processor cores exceeds a "high watermark" threshold above which a high-frequency processor core of the plurality of processor cores should be unshielded and operated.

If, at block 504, the average workload is determined to have exceeded the first threshold, then at block 506, at least one processor core a high-frequency processor core) of the plurality of processor cores may be transitioned, e.g., by OS scheduler 12, to an unshielded state. At block 508, one or more tasks may be assigned, e.g., by OS scheduler 12, to the newly unshielded processor core.

However, at block 504, if the average workload is determined not to have exceeded the first threshold, then at block 510, it may be determined, e.g., by OS scheduler 12, whether the average workload falls below a second threshold. For instance, it may be determined, e.g., by OS scheduler 12, whether the average workload of the plurality of processor cores falls below a "low watermark" threshold, below which a, high-frequency processor core of the plurality of processor cores should be shielded and transitioned to a reduced-power state.

If at block 510 the average workload is determined not to have fallen below the second threshold, then method 500 may proceed back to block 502. In various embodiments, a predetermined about of time (e.g., 4-6 seconds, or 5 seconds) may elapse before the average workload is determined once again at block 502.

However, at block 510, if the average workload is determined to have fallen below the second threshold, then at block 512, a processor core of the plurality of processor cores may be transitioned, e.g., by OS scheduler 12, to a shielded state. At block 514, one or more existing tasks already assigned to the newly shielded processor core may be allowed, e.g., by OS scheduler 12, to be executed to completion. At block 516, after the existing tasks are run to completion, the shielded processor core may be transitioned, e.g., by OS scheduler 12, to a reduced-power state.

Before describing an example computing device suitable for use to practice embodiments of the present disclosure, it should be noted that while the disclosure has been substantially presented in the context of heterogeneous processor cores, the present disclosure is not so limited. Embodiments of the present disclosure may be practiced with homogeneous as well as heterogeneous processor cores.

Figure 6:
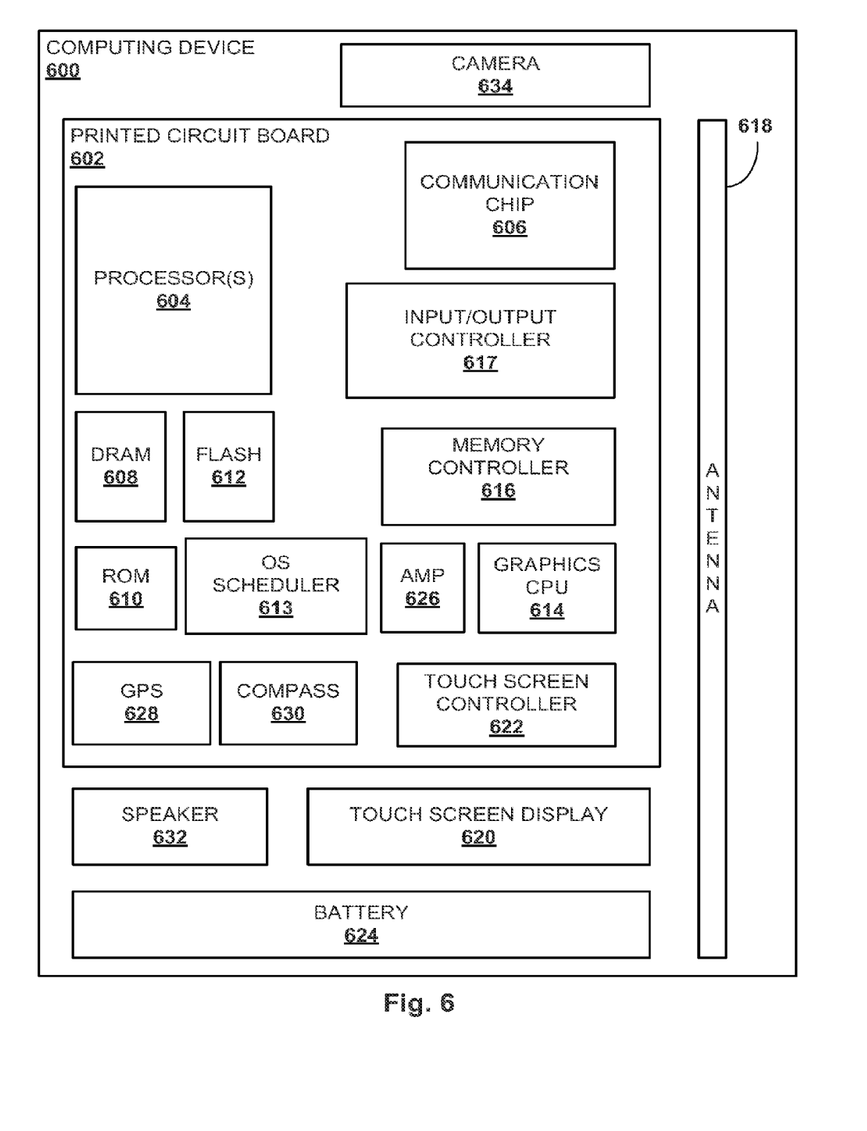
FIG. 6 schematically depicts an example computing device on which disclosed techniques may be implemented, in accordance with various embodiments.

FIG. 6 illustrates an example computing device 600 (which may also be referred to as a system) suitable for use as computing device 10, in accordance with various embodiments. The computing device 600 houses a printed circuit board ("PCB") 602. The PCB 602 may include a number of components, including but not limited to a processor 604 and at least one communication chip 606. The processor 604 may be physically and electrically coupled to the PCB 602. In various embodiments, the processor 604 may include two or more processor cores. In various embodiments, the at least one communication chip 606 may also be physically and electrically coupled to the PCB 602. In further implementations, the communication chip 606 may be part of the processor 604.

Depending on its applications, computing device 600 may include other components that may or may not be physically and electrically coupled to the PCB 602. These other components include, but are not limited to, volatile memory (e.g., dynamic random access memory 608, also referred to as "DRAM"), non-volatile memory (e.g., read only memory 610, also referred to as "ROM"), flash memory 612, an OS scheduler 613 (which may exist in hardware or software), a graphics processor 614, a digital signal processor (not shown), a crypto processor (not shown), a memory controller 616, an input/output ("I/O") controller 617, an antenna 618, a display (not shown), a touch screen display 620, a touch screen controller 622, a battery 624, an audio codec (not shown), a video codec (not shown), a power amplifier 626, a global positioning system ("GPS") device 628, a compass 630, an accelerometer (not shown), a gyroscope (not shown), a speaker 632, a camera 634, and a mass storage device (such as hard disk drive, a solid state drive, compact disk ("CD"), digital versatile disk ("DVD"))(not shown), and so forth.

In various embodiments, volatile memory (e.g., DRAM 608), non-volatile memory (e.g., ROM 610), flash memory 612, and the mass storage device may include programming instructions configured to enable computing device 600, in response to execution by processor(s) 604, to practice all or selected aspects of method 500.

The communication chip 606 may enable wired and/or wireless communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 606 may implement any of a number of wireless standards or protocols, including but not limited to Wi-Fi (IEEE 802.11 family), WiMAX (IEEE 802.16 family), IEEE 802.20, Long Term evolution ("LTE"), Ev-DO, HSPA+, HSDPA+, HSUPA+, EDGE, GSM, GPRS CDMA, TDMA, DECT, Bluetooth, derivatives thereof, as well as any other wireless protocols that are designated as 3G, 4G, 5G, and beyond. The computing device 600 may include a plurality of communication chips 606. For instance, a first communication chip 606 may be dedicated to shorter range wireless communications such as Wi-Fi and Bluetooth and a second communication chip 606 may be dedicated to longer range wireless communications such as GPS, EDGE, GPRS, CDMA, WiMAX, LTE, Ev-DO, and others.

In various implementations, the computing device 600 may be a laptop, a netbook, a tablet, a notebook, an ultrabook, a smart phone, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 600 may be any other electronic device that processes data.

Embodiments of apparatus, computer-implemented methods, systems, devices, and computer-readable media are described herein for distributing tasks among a plurality of processor cores. In various embodiments, a first processor core of a plurality of processor cores of a computing device may be transitioned to a shielded state, in which no new tasks are to be assigned to the first processor core and one or more tasks already assigned to the first processor core are executed to completion, in response to a determination that a criterion has been met. In various embodiments, the criterion may be based at least in part on a condition of the computing device, such as power available to the computing device or a temperature associated with the computing device. In various embodiments, the first processor core may be transitioned to a reduced-power state after the one or more tasks already assigned to the first processor core are executed to completion.

In various embodiments, the reduced-power state may be a state in which one or more core phase lock loops associated with the first processor core are shut down, a cache associated the first processor core is flushed, and/or a state of the first processor core is saved to cache.

In various embodiments, the criterion may be whether a workload of the plurality of processor cores falls below a predetermined threshold. In various embodiments, the predetermined threshold may be determined based at least in part on a battery power level of the computing device and/or a thermal state of the computing device.

In various embodiments, the workload may be an average workload of the plurality of processor cores. In various embodiments, a current load level of the plurality of processor cores may be periodically measured to determine the average workload of the plurality of processor cores. In various embodiments, the current load level of the plurality of processor cores may be measured every 4-6 seconds.

In various embodiments, the first processor core may be transitioned to an unshielded state, in which new tasks are to be assigned to the first processor core, in response to a determination that a second criterion has been met. In various embodiments, the second criterion may be whether a workload of the plurality of processor cores exceeds a second predetermined threshold.

In various embodiments, a second processor core of the plurality of processor cores of the computing device may be transitioned to a shielded state, in which no new tasks are to be assigned to the second processor core and tasks already assigned to the second processor core are executed to completion, in response to a determination that a third criterion has been met. In various embodiments, the third criterion may be different than the first criterion. In various embodiments, the first and second processor cores may operate at different frequencies.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. At least one non-transitory computer-readable medium having computer-readable code embodied therein, the computer-readable code comprising instructions configured to enable a computing device, in response to execution of the instructions by the computing device, to transition a first processor core of a plurality of processor cores of the computing device to a shielded state, in which no new tasks are to be assigned to the first processor core and one or more tasks already assigned to the first processor core are executed to completion, in response to a determination that a criterion has been met, the criterion based at least in part on a condition of the computing device, and to transition the first processor core to a reduced-power state after the one or more tasks already assigned to the first processor core are executed to completion, wherein the criterion includes whether a workload of the plurality of processor cores falls below a predetermined threshold, and wherein the workload is an average workload of the plurality of processor cores.

2. The at least one computer-readable medium of claim 1, wherein the reduced-power state comprises a state in which one or more core phase lock loops associated with the first processor core are shut down, a cache associated the first processor core is flushed, and a state of the first processor core is saved to cache.

3. The at least one computer-readable medium of claim 1, wherein the instructions, in response to execution by the computing device, further enable the computing device to assign tasks to a second processor core while the first processor core is in the shielded state, wherein the first processor core and the second processor core are included in a single package.

4. The at least one computer-readable medium of claim 1, wherein the predetermined threshold is determined based at least in part on a battery power level of the computing device.

5. The at least one computer-readable medium of claim 1, wherein the predetermined threshold is determined based at least in part on a temperature associated with the computing device.

6. The at least one computer-readable medium of claim 1, wherein the instructions, in response to execution by the computing device, further enable the computing device to periodically measure a current load level of the plurality of processor cores to determine the average workload of the plurality of processor cores.

7. The at least one computer-readable medium of claim 1, wherein the criterion is a first criterion, and wherein the instructions, in response to execution by the computing device, further enable the computing device to transition the first processor core to an unshielded state, in which new tasks are to be assigned to the first processor core, in response to a determination that a second criterion has been met.

8. The at least one computer-readable medium of claim 7, wherein the second criterion comprises whether a workload of the plurality of processor cores exceeds a predetermined threshold.

9. The at least one computer-readable medium of claim 1, wherein the criterion is a first criterion, and wherein the instructions, in response to execution by the computing device, further enable the computing device to transition a second processor core of the plurality of processor cores of the computing device to a shielded state, in which no new tasks are to be assigned to the second processor core and tasks already assigned to the second processor core are executed to completion, in response to a determination that a second criterion has been met, the second criterion being different than the first criterion.

10. The at least one computer-readable medium of claim 9, wherein the first and second processor cores operate at different frequencies.

11. The at least one computer-readable medium of claim 9, wherein the first criterion comprises whether a workload of the plurality of processor cores falls below a first predetermined threshold, and the second criterion comprises whether the workload of the plurality of processor cores falls below a second predetermined threshold that is different than the first predetermined threshold.

12. A system, comprising:
   memory;
   a plurality of processor cores operably coupled to the memory; and
   a scheduler to be operated by one or more of the plurality of processor cores to:
     determine that a criterion has been met, the criterion being based at least in part on a condition of the system;
     transition a first processor core of the plurality of processor cores to a shielded state, in which no new tasks are to be assigned to the first processor core and one or more tasks already assigned to the first processor core are executed to completion;

transition the first processor core to a reduced-power state after the one or more tasks already assigned to the first processor core are executed to completion, wherein the scheduler remains in position to transition the first processor core out of the reduced-power state at a subsequent point in time; and assign tasks to a second processor core of the plurality of processor cores while the first processor core is in the reduced power state, wherein the first processor core and the second processor core are included in a multi-core processor.

13. The system of claim 12, wherein the reduced-power state comprises a state in which one or more core phase lock loops associated with the first processor core are shut down, a cache associated the first processor core is flushed, and a state of the first processor core is saved to cache.

14. The system of claim 12, wherein the criterion comprises whether a workload of the plurality of processor cores falls below a predetermined threshold.

15. The system of claim 14, wherein the predetermined threshold is determined based at least in part on a battery power level of the computing device.

16. The system of claim 14, wherein the predetermined threshold is determined based at least in part on a thermal state of the computing device.

17. The system of claim 14, wherein the workload is an average workload of the plurality of processor cores, and wherein the scheduler is further to periodically measure a current load level of the plurality of processor cores to determine the average workload of the plurality of processor cores.

18. The system of claim 12, wherein the criterion is a first criterion, and wherein the scheduler is further to transition the first processor core to an unshielded state, in which new tasks are to be assigned to the first processor core, in response to a determination that a second criterion has been met.

19. The system of claim 18, wherein the second criterion comprises whether a workload of the plurality of processor cores exceeds a predetermined threshold.

20. The system of claim 12, wherein the criterion is a first criterion, and wherein the scheduler is further to:
determine whether a second criterion that is different from the first criterion has been met; and
transition the second processor core of the plurality of processor cores to a shielded state, in which no new tasks are to be assigned to the second processor core and tasks already assigned to the second processor core are executed to completion, in response to a determination that the second criterion has been met.

21. A computer-implemented method, comprising:
determining, by a scheduler configured to assign tasks to a plurality of processor cores of a computing device, that a workload of the plurality of processor cores meets a criterion, the criterion being based at least in part on power available to a computing device or a temperature associated with the computing device;
transitioning, by the scheduler, a first processor core of the plurality of processor cores of the computing device to a shielded state, in which no new tasks are to be assigned to the first processor core and without migrating one or more tasks already assigned to the first processor core; and
transitioning, by the scheduler, the first processor core to a reduced-power state after the one or more tasks already assigned to the first processor core are executed to completion; and
assigning, by the scheduler, a task to a second processor core while the first processor core is in the reduced power state, wherein the first processor core and the second processor core are included in a package.

22. The computer-implemented method of claim 21, wherein transitioning the first processor core to a reduced-power state comprises transitioning the first processor core to a state in which one or more core phase lock loops associated with the first processor core are shut down, a cache associated the first processor core is flushed, and a state of the first processor core is saved to cache.

23. The computer-implemented method of claim 21, wherein the criterion comprises whether the workload of the plurality of processor cores falls below a predetermined threshold.

24. The computer-implemented method of claim 21, wherein the criterion is a first criterion, and wherein the instructions, in response to execution by the computing device, further enable the computing device to transition the first processor core to an unshielded state, in which new tasks are to be assigned to the first processor core, in response to a determination that the workload of the plurality of processor cores meets a second criterion.

25. The computer-implemented method of claim 21, wherein the criterion is a first criterion, and wherein the method further comprises transitioning the second processor core of the plurality of processor cores of the computing device to a shielded state, in which no new tasks are to be assigned to the second processor core and tasks already assigned to the second processor core are executed to completion, in response to a determination that a second criterion has been met, the second criterion being different than the first criterion.

* * * * *